United States Patent [19]

Powell et al.

[11] Patent Number: 5,783,988
[45] Date of Patent: Jul. 21, 1998

[54] VEHICLE SECURITY SYSTEM

[75] Inventors: Harry Powell, Shipman, Va.; Ken DeWitt, Phoenix, Md.

[73] Assignee: Designtech International Inc., Springfield, Va.

[21] Appl. No.: 555,285

[22] Filed: Nov. 8, 1995

[51] Int. Cl.$^6$ ................................. B60R 25/10
[52] U.S. Cl. ................. 340/426; 340/428; 310/81; 73/1.13
[58] Field of Search ................. 340/425.5, 426, 340/428, 429; 73/1.13, 1.15, 649, 651; 310/81, 66 E

[56] References Cited

U.S. PATENT DOCUMENTS 3,794,967  2/1974  Fischer .................... 340/428
3,815,088  6/1974  Kumpfbeck ............... 340/428
5,325,718  7/1994  Ono ......................... 340/429

*Primary Examiner*—Jeffery Hofsass
*Assistant Examiner*—Daryl C. Pope
*Attorney, Agent, or Firm*—Oblon, Spivak, McClelland, Maier & Neustadt, P.C.

[57] ABSTRACT

In a vehicle alarm system, as one feature circuitry is provided which can be attached to detect an input from a door pin input switch, and which can detect the opening and closing of the door if the door pin input switch is either a positively triggered pin switch or a negatively triggered pin switch. Furthermore, a specific structure of a piezoelectric disk sensor and detecting circuitry associated therewith is provided. The piezoelectric disk sensor has a weight mounted off a central axis at a distance of approximately a radius of the piezoelectric disk from a rigid mounting area. The associated circuitry evaluates all information from a shock sensing signal detected by the piezoelectric disk sensor.

19 Claims, 6 Drawing Sheets

VEHICLE SECURITY SYSTEM

BACKGROUND OF THE INVENTION

1. Field of the Invention

The present invention is directed to an improved input unit for a vehicle security system, such as a vehicle alarm system, which can accept either positively or negatively triggered inputs. The present invention also relates to a sensor system which can be utilized in a vehicle security system.

2. Background of the Invention

All vehicles currently on the market have pin switches in a door jam which are activated by opening and closing of the vehicle door. Since most vehicles have a negatively triggered pin switch, the majority of vehicle alarm systems currently on the market have a negatively activated input for a door pin switch monitoring. The remaining types of vehicles switch positive. In the case of these remaining positively switching vehicles, alarm systems installed must use an external relay to switch a positive trigger to a negative trigger signal for the input to the vehicle alarm system. The use of such an external relay is costly and requires extra installation time.

There are currently some vehicle alarm systems which solve such a problem by utilizing two separate input wires, one for a negatively triggered pin switch and one for a positively triggered pin switch. However, such conventional systems with two separate input wires require a redundant circuitry in their implementation, and still require extra installation effort in ensuring connection to the correct input.

Vehicle alarm systems also commonly use a piezoelectric disk as a shock sensor. These devices are man-made electromechanical devices that are used in many common household devices, in addition to use in vehicle alarm systems. Such devices are used as buzzer alarms in smoke detectors, ringers in telephones, sounders in pagers, etc. Such piezoelectric disks are very efficient in converting electrical energy into sound (mechanical) energy. As in all such crystalline devices, such an energy conversion also works in reverse. That is, applying an electrical impulse across a piezoelectric disk causes the piezoelectric disk to bend. Conversely, applying a bending moment to the piezoelectric disk generates an electrical impulse across the piezoelectric disk, which can then be sensed. This sensing operation is used in implementing a piezoelectric disk as a shock sensor by sensing the electrical impulse generated when the piezoelectric disk is bent.

The mass of a typical piezoelectric disk, which is for example 25 mm in diameter, is very low. As a result, an impulse of motion (e.g., a shock) applied to the piezoelectric disk is not easily detected. As a result, a significantly larger mass must be applied to the piezoelectric disk for the piezoelectric disk to detect a shock. This is often accomplished, and with reference to FIG. 1, as expediently as soldering a weight 30, such as a bolt, to piezoelectric disk 20. By rigidly fastening one edge 40 of the piezoelectric disk 20, e.g. by soldering it to a conductive surface 10, and subjecting the system to a shock, the piezoelectric disk 20 will oscillate in a damping fashion with a moment arm equal to the distance from a center of mass 60 to the rigidly mounted edge 40 of the piezoelectric disk 20. Due to the very high ratio of the mass of the weight 30 to the mass of the piezoelectric disk 20, the center of mass of the system is nominally the same as the center of mass 60 of the weight 30, which is attached at the mounting 50 to the piezoelectric disk 20. This mounting 50 may typically also be a soldering.

In this way, FIG. 1 shows a typical shock sensor as conventionally used in many vehicle alarm systems. The weight 30 is conventionally soldered to the piezoelectric disk 20 at point 50 between the center and far top of the piezoelectric disk 20 to get as great a moment arm as possible. The fastened edge 40 of the piezoelectric disk 20 to the substrate 10 provides one side of the electrical output and a wire (not shown in FIG. 1) soldered to a ceramic crystal surface of the piezoelectric disk 20 provides another output. A movement of the weight 30 causes a bending in the piezoelectric disk 20, which generates an electrical signal which is often several volts in amplitude and which alternates at a frequency which is equal to a mechanical resonance of the system. Typical resonances are from hundreds of cycles per second to several thousand cycles per second.

A conventional alarm system utilizes a peak voltage detector on the output of the electrical signal from the sensor shown in FIG. 1. When the amplitude of the output signal exceeds a predetermined threshold level, an alarm situation is detected and an alarm is activated. Sensitivity of the system can be adjusted by varying the threshold level detected. Such a conventional shock detector circuit is shown in FIG. 2 of the present specification.

As shown in FIG. 2, the signals received from the piezoelectric sensor 20 are input into an operational amplifier 22. The signal output by amplifier 22 is then fed into a comparator 27 through a diode 23. Also connected to a point between the diode 23 and the input to the comparator 27, and between ground, are in parallel capacitor 24 and resistor R25. The other input into comparator 27 is fed from potentiometer R26. Based on adjusting potentiometer 26, the threshold level can be adjusted. With a conventional shock detector circuit as shown in FIG. 2, when the signal input from piezoelectric disk 20 exceeds the level set by threshold adjuster R26, a shock is detected and a signal indicating such is output to an alarm system.

Such an approach of the conventional system suffers from several drawbacks. First, there is no fixed mounting location for the "box" that contains the sensor of the alarm system. That is, these alarm systems are typically sold as aftermarket systems and are installed by a wide range of users from do-it-yourself vehicle owners to professional installers. In such after-market systems, the "box" which contains the sensor and associated circuitry may be mounted at any angle and with any rigidity of the mounting, and therefore the ability of the sensor to transfer shock impulses is dramatically variable. Secondly, the direction from which shock is to enter the piezoelectric disk in the sensor which is contained in the "box" is completely unknown. Third, the environment, which includes temperature and background mechanical vibration and shock, is unknown. Fourth, the exact nature of the shock to be sensed can vary from an impact (e.g., a window being broken) to vibrations (e.g., a door being pried open).

SUMMARY OF THE INVENTION

Accordingly, one object of the present invention is to provide a novel input circuitry for a vehicle alarm system which can accept inputs from both a negatively triggered pin switch and a positively triggered pin switch.

One further object of the system of the present invention is to provide a novel shock sensor which provides an enhanced operation of detecting shocks.

The present invention achieves its objectives by providing a novel input circuitry which can receive inputs from both negatively triggered and positively triggered pin switches.

The present invention also achieves its objectives by a novel technique of mounting a mass onto a piezoelectric disk, and a novel technique of then sensing signals generated by this piezoelectric disk structure. More specifically, in this feature of the present invention, a mass which is attached to the piezoelectric disk is mounted off of a central axis of the piezoelectric disk. The sensing operation also takes advantage of all information from the signal output by the piezoelectric disk sensor.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 3:
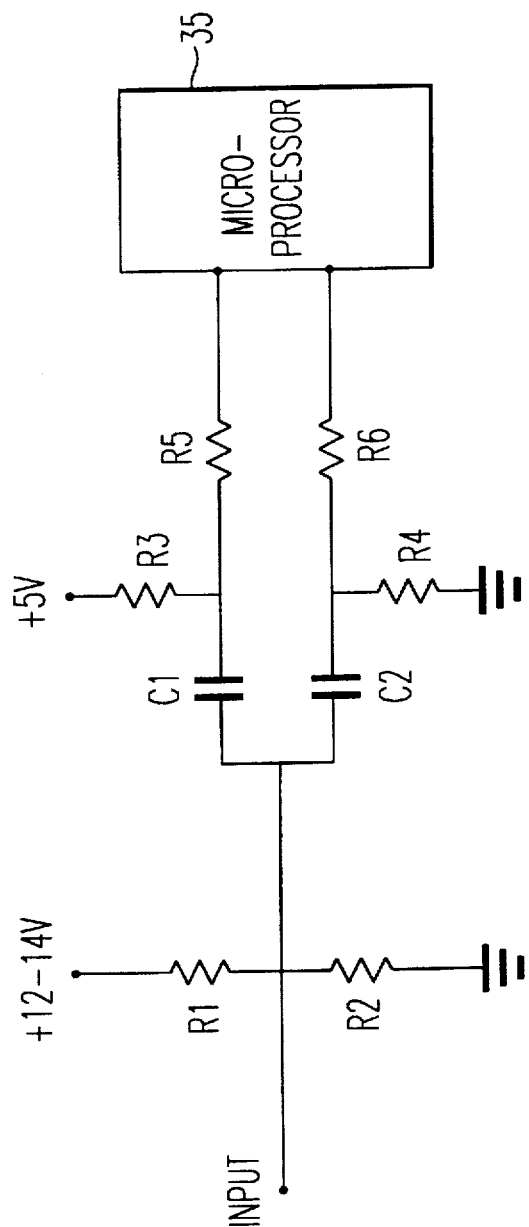
FIG. 3 shows the details of an input circuitry of the present invention.

Referring now to the drawings, wherein like reference numerals designate identical or corresponding parts throughout the several views, and more particularly to FIG. 3 thereof, there is detailed an input circuitry of the system of the present invention.

As shown in FIG. 3 of the present specification, the system of the present invention requires only one input which can receive both negatively triggered and positively triggered pin switches. This provides a significant advantage over the conventional systems which utilize two inputs, as the system of the present invention does not require any redundant circuitry. Furthermore, the system of the present invention provides a significant advantage of simplifying installation as only one input is needed. The circuitry of the present invention specifically operates to accept either positively triggered or negatively triggered pin switches at the input.

As shown in FIG. 3, the system of the present invention has connected to the input a resistor R1, which in turn is also connected to a battery of a vehicle, which may be between +12–14 V. Also connected to the input is a resistor R2 which is also connected to ground. The values of each of these resistors R1 and R2 may be 1 KΩ, as examples only. The input is also connected to a point between two capacitors C1 and C2, which in turn are respectively connected to a +5 V biased output and a ground biased output through respective resistors R5 and R6. Connected to a point between capacitor C1 and resistor R5 is a further resistor R3, which is also connected to a +5 V source. Connected to a point between capacitor C2 and resistor R6 is a further resistor R4, which is also connected to ground.

The circuit shown in FIG. 3 provides a beneficial operation of eliminating a need for two wires that perform the same function, and eliminating a need of identifying a polarity of a vehicle door pin switch. The circuit shown in FIG. 3 essentially accomplishes a DC isolated input-output system which only passes an AC pulse to dual outputs.

The input is biased to 6–7 V DC through a voltage divider formed of resistors R1 and R2. This bias is generally maintained when the door is closed since a dome lamp side of the door pin switch is generally an open circuit in this state. When the vehicle door is opened, a solid 6 or 7 V input pulse appears at the input as the door pin switch provides a path to +12 V or ground. Such a pulse is passed through the two different capacitors C1 and C2. capacitor C2 has an output side biased at ground through resistor R4, which may be a 1 MΩ resistor as an example only, and capacitor C1 has an output side biased at +5 V through resistor R3, which may also be a 1 MΩ resistor as an example only. At this point, the pulses are passed through resistors R5 and R6 to a diode protected current sourcing/sinking input of a conventional microprocessor 35, whose voltage supply is 5 V. When the vehicle door is then closed, the circuit biasing provides for a quick return to the 6 or 7 V DC, and an opposite polarity pulse to the input.

When connected to a positively triggered pin switch, a positive pulse on the +5 V biased output side, through resistor R5, causes the microprocessor 35 to sink 0.2 mA, but this does not produce a voltage change in the output because of the diode protected input of the microprocessor 35. This same positive pulse results in a 6 or 7 V pulse on the ground output side through resistor R6 and produces a voltage change of +5 V at the microprocessor 35. This change of +5 V on the microprocessor 35 thus allows microprocessor 35 to detect this positive pulse.

When connected to a negatively triggered pin switch, a negative pulse on the ground biased output side through resistor R6 causes the microprocessor 35 to source 0.2 mA, but this does not produce a voltage change on the output because of the diode protected input of the microprocessor 35. This same pulse causes a −6 or −7 V pulse on the +5 output side through resistor R5 and produces a voltage change of −5 V at the microprocessor 35. This voltage change of −5 V on the microprocessor 35 thus allows the microprocessor 35 to detect the negative pulse.

With such a structure as in the present invention, the microprocessor 35 can look for a door closing after some simple set-up condition and use that pulse to know when the door is closed, and the opposite pulse to know when the door is opened. As a result, the microprocessor 35 will then only enter into an alarm mode when the vehicle door is opened.

Figure 4:
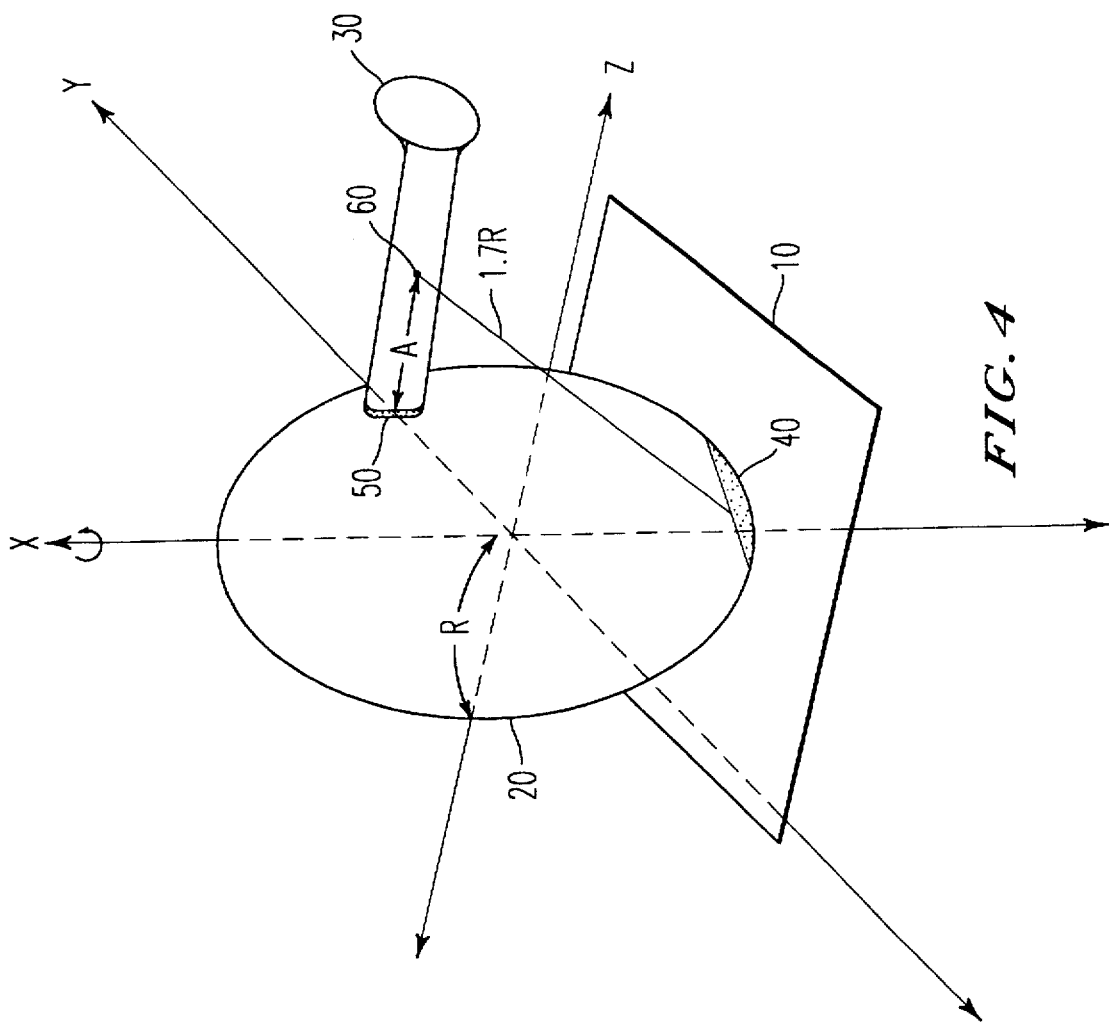
FIG. 4 shows a mounting of a weight onto a piezoelectric disk according to the present invention.

FIG. 4 of the present specification shows the improved weight mounting system of the present invention. As an ideal situation, a piezoelectric sensor should be designed to handle all variations in its mounting position, and to permit such a system to be arbitrarily installed, and to provide consistent results in any type of environment. In this way, an ideal piezoelectric sensor should work identically regardless of a direction from which a shock originates. This means that the piezoelectric sensor must be orthogonally independent. Referring to the conventional mounting shown in FIG. 1 of the present specification, it is noted that orthogonal coordinates are shown with directions X, Y and Z labeled. In such a conventional system, any shock applied in the Z direction is applied in an angular moment arm of approximately 2R, where R is the radius of the piezoelectric disk 20. The system then vibrates with the center of mass acting on the approximate distance $\sqrt{4R^2+A^2}$ (representing the distance from the rigid mounting 40 to the center of mass 60) and flexing the piezoelectric disk 20 across its center, thereby generating a large electrical signal.

However, when the shock is received along the Y axis, the angular moment arm is only the distance A long (representing the distance from mounting 50 to the center of mass 60). Further, the piezoelectric disk 20 cannot bend since it is "on end" by virtue of its rigid attachment to substrate 10 at point 40, and therefore with such a shock along the Y axis, the piezoelectric disk 20 can only generate a torsional twist around the X axis (shown by the arrow at the X axis). This results in generating an electrical signal from a shock along the Y axis which is very different from the bending signal of a shock along the Z axis. Both the frequency and the amplitude of the electrical signals generated by these two different shocks are very different.

Figure 1:
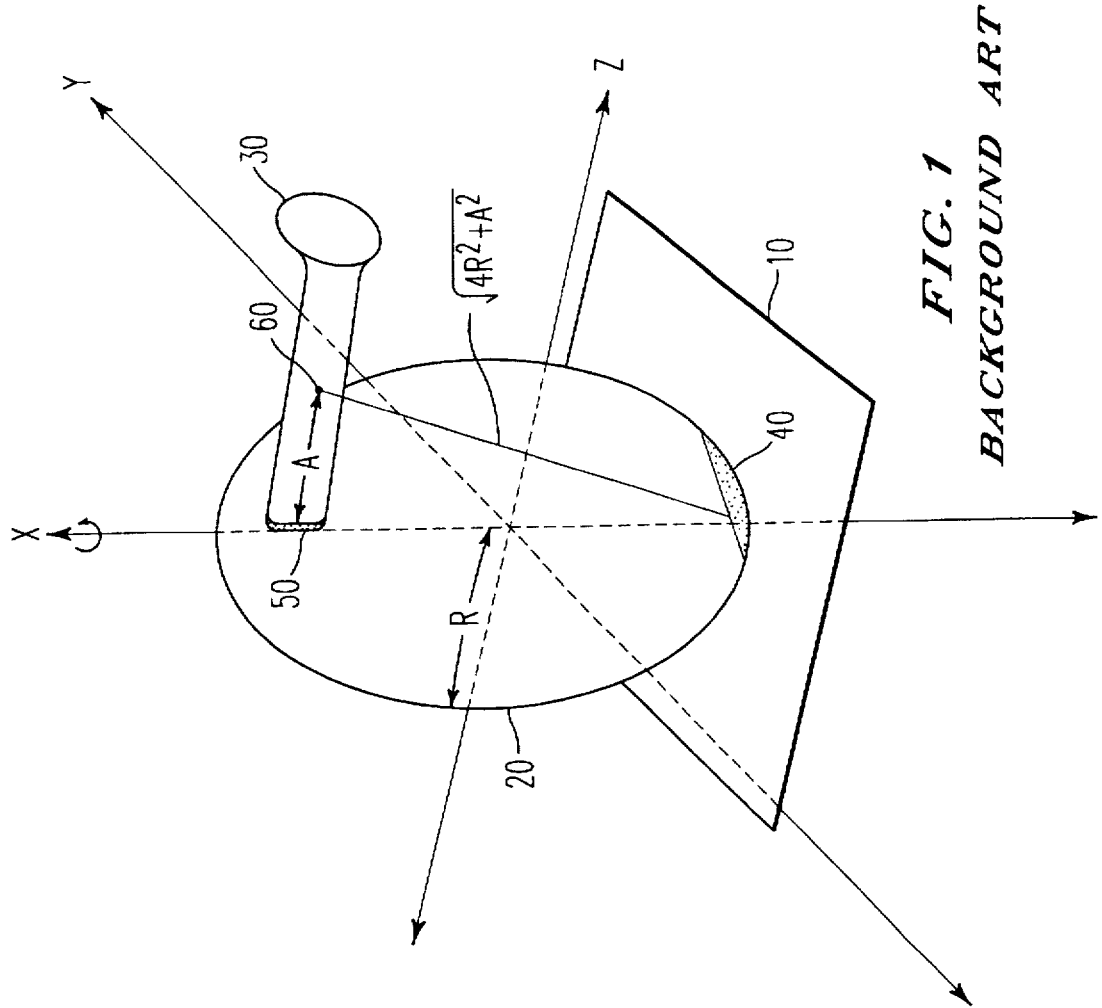
FIG. 1 details a conventional mounting of a weight onto a piezoelectric disk.

Furthermore, in this conventional system shown in FIG. 1, a shock applied in the X direction results in an angular moment arm of distance A, and as a result, the piezoelectric disk 20 vibrates with the center of mass acting on an arm of $\sqrt{4R^2+A^2}$.

Shown below in Table 1 is a chart which summarizes the operating nature of the conventional system shown in FIG. 1.

TABLE 1

| DIRECTION OF SHOCK | APPLIED ANGULAR MOMENT ARM | VIBRATION ARM | RELATIVE SIGNAL STRENGTH |
| --- | --- | --- | --- |
| X | A | $\sqrt{4R^2+A^2}$ | Largest |
| Y | A | Torsional | Small |
| Z | 2R | $\sqrt{4R^2+A^2}$ | Large |

As shown above in Table 1, such a conventional system has a wide performance variation based on the direction of the shock, and such a system experiences wide differences in sensitivity depending on the nature and direction of an applied shock.

The system of the present invention shown in FIG. 4 provides improvements in operation over the conventional system shown in FIG. 1. Similar reference numerals shown in FIG. 4 as shown in FIG. 1 indicate corresponding elements.

As shown in FIG. 4, the mounting position of the weight 30 differs in the system of the present invention from that in the conventional system shown in FIG. 1. More specifically, this weight 30 is mounted in a position which approximates the radius R away (e.g. 0.8R) from the center of the piezoelectric disk 20, and at a position halfway up the piezoelectric disk 20 and out to one edge of the piezoelectric disk 20, i.e. on a diameter of the piezoelectric disk 20 which is parallel to the substrate 10.

Shown below in Table 2 is a summary of the operation of such a system based on the direction of shock with the specific mounting system of the present invention shown in FIG. 4.

TABLE 2

| DIRECTION OF SHOCK | APPLIED ANGULAR MOMENT ARM | VIBRATION ARM | RELATIVE SIGNAL STRENGTH |
| --- | --- | --- | --- |
| X | R | 1.7R | Nominal |
| Y | R | 1.7R | Nominal |
| Z | 1.4R | 1.7R | Nominal |

With such an operation of the system of the present invention, despite having a 40% longer applied arm for a shock along the Z axis, the frequency and amplitude of the shock sensing are virtually identical in all three axes, and the dramatic differences of a torsional action of the conventional mounting on the Y axis is eliminated. As a result, such a system of the present invention provides a shock sensor which can be mounted in virtually any position and still provide consistent results.

Figure 6:
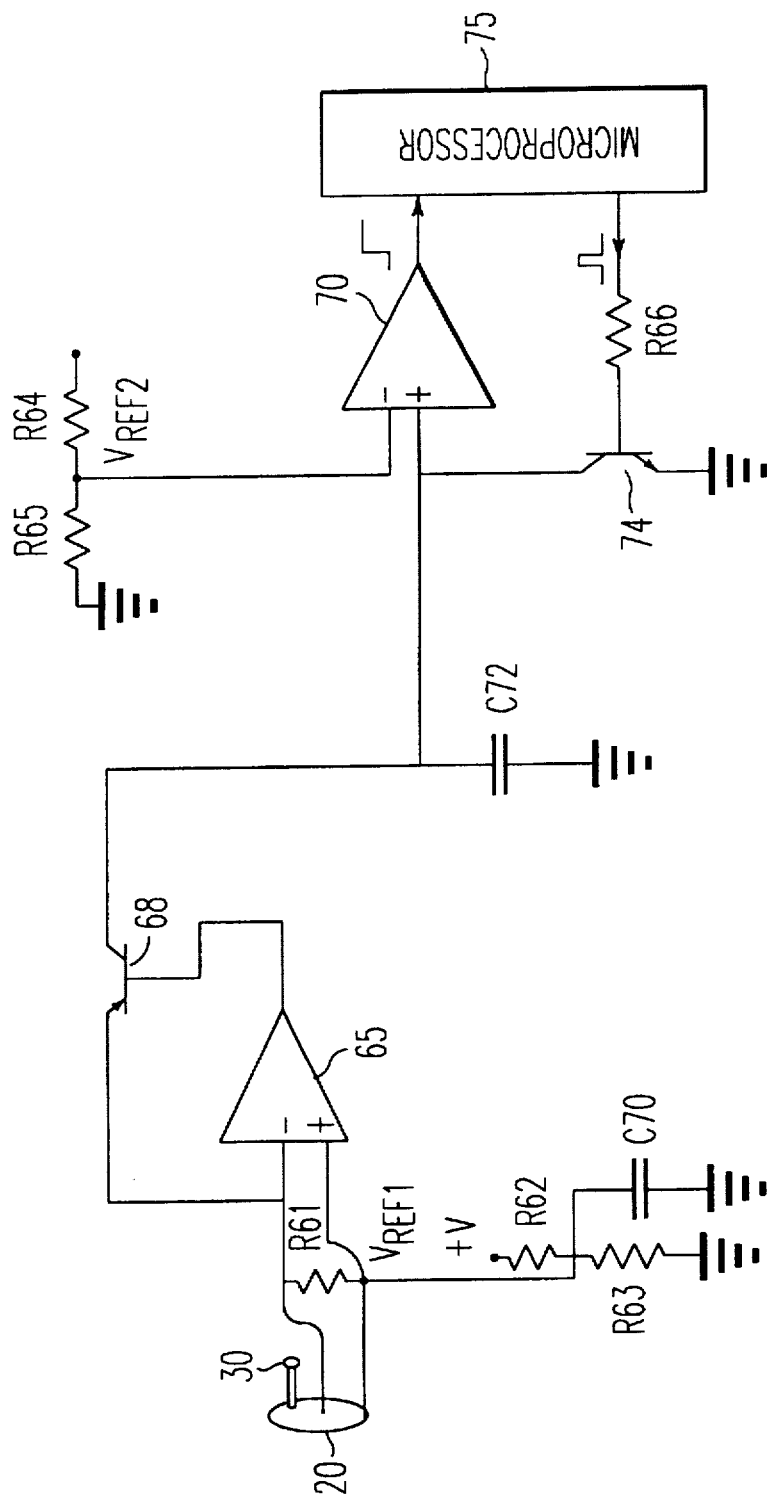
FIG. 6 shows a circuit for detecting a shock signal from the piezoelectric disk shown in FIG. 4.

The circuit shown in FIG. 6 is an enhanced circuit for reading the signals generated by the piezoelectric circuit of FIG. 4.

Figure 2:
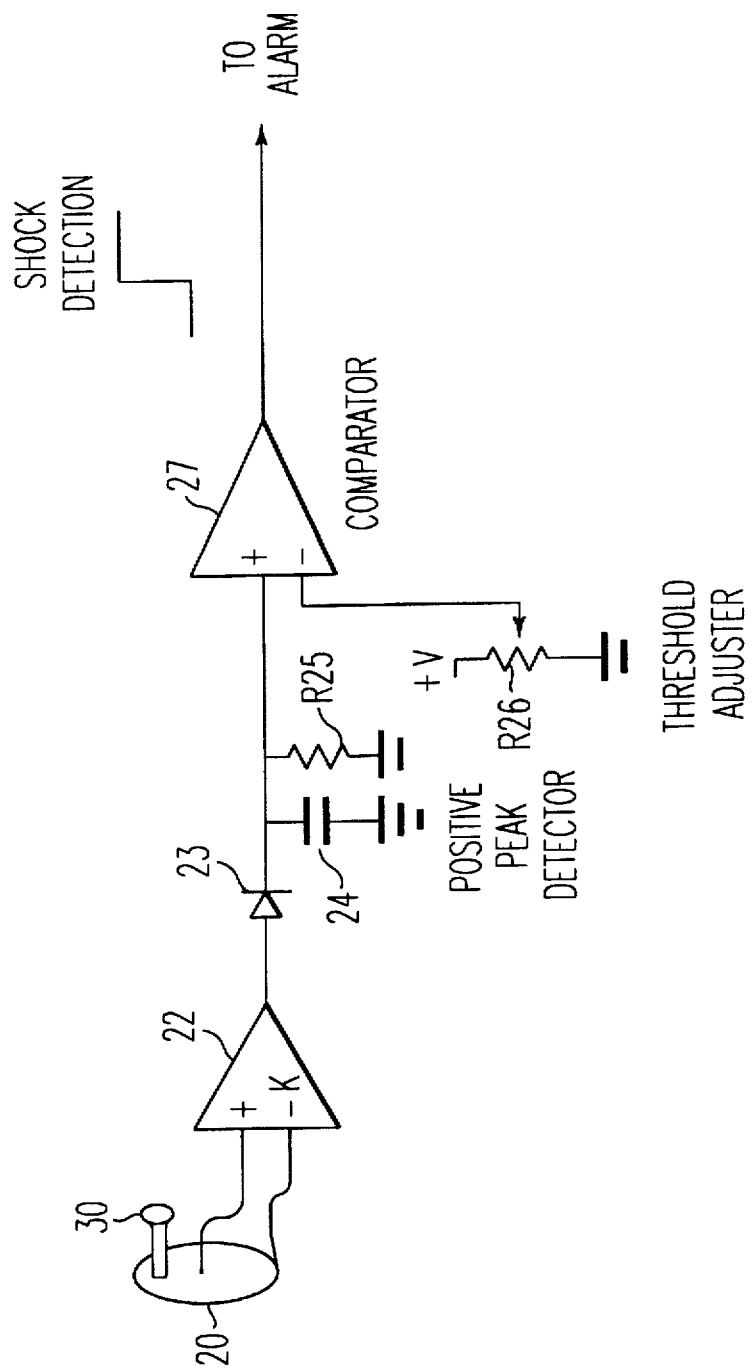
FIG. 2 details a conventional shock detector circuit for receiving a signal from a piezoelectric disk.

The conventional shock detector circuit shown in FIG. 2 operates as a voltage amplification and peak detection circuit which determines when to set off an alarm. The system shown in FIG. 6 has two functions, a first function is detection of an overall energy in a given shock, and another function is establishing a compensating detection threshold for an alarm.

For a given shock, a size (voltage) of a largest peak signal is not a complete description of the type or size of the shock signal. A signal detected by a piezoelectric sensor is a signal which has been heavily filtered by the transmission medium (e.g., the vehicle, the frame, etc.) as well as being affected by the source (e.g., a hammer, a kick, a crowbar, etc.). The shock detector circuit shown in FIG. 6 integrates an entire shock signal to measure the entire energy in the shock signal.

Figure 5:
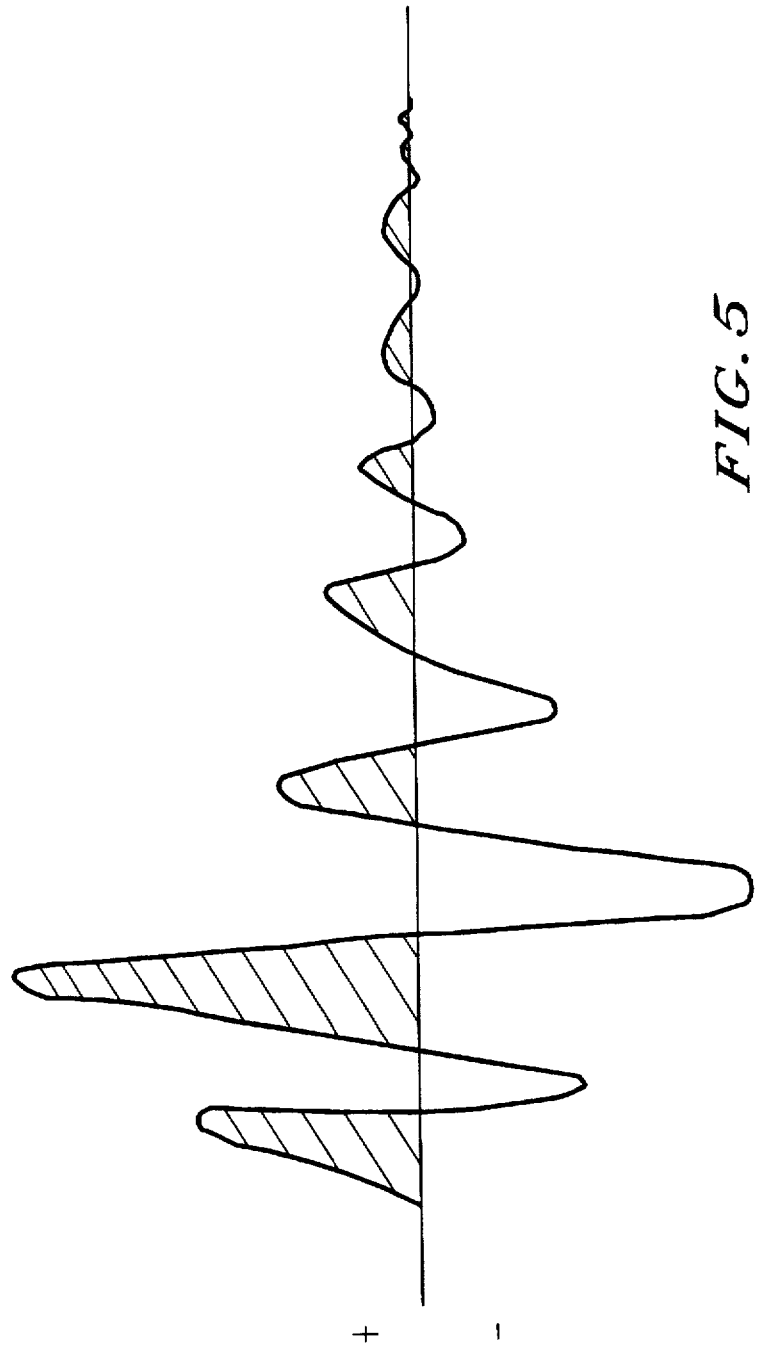
FIG. 5 shows signals explaining the operation of the structure shown in FIG. 4.

The signal generated by a piezoelectric disk 20 is a damped sine wave which lasts several hundred milliseconds over many cycles, as is shown for example in FIG. 5. The circuitry shown in FIG. 6 is used to integrate the entire area under one-half of the signal shown in FIG. 5, to thus evaluate a full significance of the received shock signal.

In operation, the circuit shown in FIG. 6 integrates all of the positive half of the oscillations from the signal output from piezoelectric disk 20 and accumulates them as a voltage across a capacitor C72.

The circuit shown in FIG. 6 operates as follows. An input signal from the piezoelectric disk 20 is input to an operational amplifier 65 across a resistor R61, which may have a value of 100 KΩ, as an example only. As a result, an electrical signal from the piezoelectric disk 20 is generated across resistor R61. One side of this signal is a reference voltage which is applied to a positive terminal of the operational amplifier 65, which may typically be an LM3324, or such. The negative input to this operational amplifier 65 is connected to the other side of resistor R61, which is represented as $V_{REF1}$, which is the "node" of virtual ground of the operation amplifier 65. Also connected to the node $V_{REF1}$ in parallel are two resistors R62 and R63, which may take on values of 1KΩ each, as examples only. Resistor R62 is also connected to the +V source and resistor R63 is also connected to ground. A capacitor C70 is connected to a point between resistor R62 and R63 and ground. Resistors R62, R63 and capicitor C70 provide a voltage divider network for voltage $V_{REF1}$. Amplifier 65 also has a feedback loop through a base emitter junction of a PNP transistor 68. As a result, when the input from the piezoelectric disk 20 goes positive, the feedback is a forward diode junction, and when the input from the piezoelectric disk 20 goes negative, the feedback is a reverse bias diode junction (high impedance).

What this means is that the positive signals on resistor R61 are immediately cancelled out by current pulled by the emitter of transistor 68, and the voltage on the output of operation amplifier 65 undergoes one diode drop (0.6 V approximately) below $V_{REF1}$. On the negative signals across resistor R61, the high impedance of the reverse bias base emitter junction results in an open loop gain for operational amplifier 65, and the output of operational amplifier 65 goes very high (positive).

With this operation, the emitter current of transistor 68 on the positive input signals is reflected in the collector of transistor 68 which charges capacitor C72, which is connected to the emitter of transistor 68. The total current is scaled by the value of resistor R61, and the total current is an integrated area of the positive signals generated by piezoelectric disk 20, and as is represented by the shaded area in FIG. 5.

A positive input of a second operational amplifier 70 is also connected to this emitter current. A negative input to this operational amplifier 70 receives a reference voltage $V_{REF2}$ through a reference voltage source +V and a voltage divider formed of resistors R64 and R65, which may take on the respective values of 22 K Ω and 4.7 K Ω, as examples only. This voltage +V may typically be 12 V. When the voltage at capacitor C72 reaches a threshold reference value, an output of operational amplifier 70 goes positive, and microprocessor 75 connected to the output of amplifier 70 is triggered by this positive output of amplifier 70.

This fact of this positive output of amplifier 70 is stored in an accumulator register in microprocessor 75. The microprocessor 75 then also cleans up or "dumps" the charge on capacitor C72. More specifically, an output from microprocessor 75 is fed through a resistor R66 and a transistor 74 to the positive input of amplifier 70. resistor R66 may have a value of 2.2 K Ω as an example only. Microprocessor 75 puts a short pulse on resistor R66, which causes transistor 74 to turn on for a short period of time, to thereby remove (or "dump") the charge on capacitor C72.

This cycle continues so long as the system is looking for a shock. Obviously, each "dump" of capacitor C72 represents a scaled portion of a shock pulse. In the absence of actual shock pulses, there is also a normal vibration which is being sensed. In addition, various leakage currents would cause capacitor C72 to charge up at an arbitrary, but continuous, rate. Thus, there is a zero based rate of dump cycles. A typical system may have an operation to dump capacitor C72 five times per second. The microprocessor 75 may use such information to calculate a zero baseline for measuring shock.

During a typical actual shock, the time between "dumps" may decrease to several milliseconds at the area of peak voltage.

The energy of a shock is therefore measured by the difference between the baseline dumps and the actual dumps measured over any period of time. Microprocessor 75 initiates the "dumps" based on a value in the accumulator therein. Since each shock results in energy received over several hundred milliseconds, a typical convenient period of time to evaluate the shock energy received may be a quarter of a second.

A second measure of the strength of a shock is the time between dumps. This measures the peak energy of a shock. The microprocessor 75 also features a register to store data as to the time between dumps. The system of the present invention makes use of both the peak energy and the average energy to decide an alarm condition, as described below.

As discussed above, conventional methods of deciding whether there is sufficient shock for an alarm is to sense a peak output voltage and to issue an alarm if the peak output voltage exceeds a threshold value. Such a conventional operation is very prone to false alarms, particularly if the alarm sensor is set to a level which is sensitive enough to detect breaking into a vehicle at a far corner of the vehicle from where the shock sensor is located.

The system of the present invention overcomes such shortcomings in the conventional systems by more accurately determining a shock condition utilizing all information available. The present invention utilizes a first criteria to issue an alarm condition if the energy level of the shock is high enough to result in two dumps of the voltage in capacitor C72 within a predetermined period of time (T). This determination can be further conditioned on if a certain number of further dumps (X) of the voltage in capacitor C72 result within a predetermined period of time, for example 250 milliseconds, following the first two dumps.

As an example, the system of the present invention may be operated so that if two dumps ever occur 2.5 milliseconds apart or less, and further if there are more than 16 dumps in a subsequent 250 milliseconds, it is determined by microprocessor 75 that an alarm condition is to be indicated.

At the same time, the system of the present invention may have a further independent evaluation by microprocessor 75 which simply evaluates whether a certain number of dumps (Y) occurs over any continuous 250 millisecond period. In this situation, the system of the present invention may determine whether, for example, 32 dumps occur during any continuous 250 millisecond time period, which would then result in an alarm condition being issued.

Obviously the system of the present invention can adjust the specific values and such values could also be updated continuously based on different environmental conditions.

Furthermore, it is beneficial that the sensitivity of an alarm can be adjusted by an installer, and perhaps later by the user of the alarm system. Such an operation may be necessary because each vehicle is different and each mounting is different, and each component in the system would have different characteristics, such as piezo gain.

Systems utilizing piezoelectric shock sensors have two items in common. These systems have microprocessors which control the system, many with nonvolatile memories, usually EEPROMs. Also, such systems have key chain multi-button transmitters with receivers as part of the system. This permits easy use and installer programming. In a typical system, using the design described in the present invention, there may be eight levels of sensitivity that can be set. This is usually more than adequate to cover component installation variations. The following chart of Table 3 below shows a typical set of values for eight sensitivity levels.

TABLE 3

| | SENSITIVITY | | | | | | | |
|---|---|---|---|---|---|---|---|---|
| | LEAST | | | | | | | MOST |
| | 1 | 2 | 3 | 4 | 5 | 6 | 7 | 8 |
| (msec) T | 0.5 | 1.0 | 2.0 | 4.0 | 8.0 | 16 | 32 | 41 |
| (count) X | 128 | 64 | 32 | 16 | 12 | 8 | 8 | 6 |
| (count) Y | 255 | 128 | 64 | 32 | 24 | 16 | 12 | 8 |

With a common three-button transmitter, a typical sensitivity selecting sequence would operate as follows. To set the shock level, one button on the transmitter can be pushed and held and the second button can be quickly pushed a predetermined number of times. Both buttons can then be released as the vehicle headlights light up to quickly flash 1 to 8 times. This flashing of the headlights would indicate the current shock sensitivity level, for example the higher the number of flashes the more sensitive the setting. Then, one of the buttons on the transmitter can be pushed a predetermined number of times, and each time the button is pushed the sensitivity level can be either increased or decreased by 1. Obviously, other operations of changing the sensitivity could also be implemented.

Obviously, numerous modifications and variations of the present invention are possible in light of the above teachings. It is therefore to be understood that, within the scope of the appended claims, the present invention may be practiced otherwise than as specifically described herein.

What is claimed as new and desired to be secured by letters Patent of the United States is:

1. A sensor comprising:
   a substrate;
   a piezoelectric disk rigidly mounted to the substrate at a first mounting area; and
   a weight mounted to the piezoelectric disk, wherein the weight is mounted on a diameter of the piezoelectric disk which parallels the substrate, at an outer portion of the piezoelectric disk.

2. The sensor according to claim 1, wherein the weight is mounted a distance 0.8R from a center of the piezoelectric disk on the diameter, where R is a radius of the piezoelectric disk.

3. The sensor according to claim 1, wherein the weight is a bolt.

4. A vehicle alarm system comprising:
   a sensor for sensing a shock and outputting a shock signal;
   circuit means for receiving the shock signal from the sensor;
   storing means for storing a value of the received shock signal; and
   a microprocessor connected to the storing means for releasing the stored value, wherein the microprocessor determines an alarm condition if the microprocessor releases the stored value a first predetermined number of times within a first predetermined time period.

5. The vehicle alarm system according to claim 4, wherein the microprocessor further determines an alarm condition if the microprocessor releases the stored value a second predetermined number of times within a second predetermined time period.

6. The vehicle alarm system according to claim 4, wherein the storing means comprises a capacitor.

7. The vehicle alarm system according to claim 4, further comprising:
   an input for receiving an input from a pin switch of the vehicle; and
   second circuit means for detecting either a positive trigger or a negative trigger on the input from the pin switch of the vehicle.

8. The vehicle alarm system according to claim 7, wherein the second circuit means comprises first and second capacitors connected in parallel, and first and second resistors connected in parallel with the first capacitor, and third and fourth resistors connected in parallel with the second capacitor.

9. The vehicle alarm system according to claim 8, further comprising a voltage source connected to the first resistor and wherein the third resistor is connected to ground.

10. The vehicle alarm system according to claim 4, wherein the sensor comprises:
    a substrate;
    a piezoelectric disk rigidly mounted to the substrate at a first mounting area; and
    a weight mounted to the piezoelectric disk, wherein the weight is mounted on a diameter of the piezoelectric disk which parallels the substrate, at an outer portion of the piezoelectric disk.

11. The vehicle alarm system according to claim 10, wherein the weight is mounted a distance 0.8R from a center of the piezoelectric disk on the diameter, where R is a radius of the piezoelectric disk.

12. The vehicle alarm system according to claim 10, wherein the weight is a bolt.

13. A vehicle alarm system comprising:
    an input for receiving an input from a pin switch of the vehicle;
    circuit means for detecting either a positive trigger or a negative trigger on the input from the pin switch of the vehicle;
    a sensor for sensing a shock and outputting a shock signal comprising:
       a substrate;
       a piezoelectric disk rigidly mounted to the substrate at a first mounting area;
       a weight mounted to the piezoelectric disk, wherein the weight is mounted on a diameter of the piezoelectric disk which parallels the substrate, at an outer portion of the piezoelectric disk;
    circuit means for receiving the shock signal from the sensor;
    storing means for storing a value of the received shock signal;
    a microprocessor connected to the storing means for releasing the stored value, wherein the microprocessor determines an alarm condition if the microprocessor releases the stored value a first predetermined number of times within a first predetermined time period.

14. The vehicle alarm system according to claim 13, wherein the weight is mounted a distance 0.8R from a center of the piezoelectric, where R is a radius of the piezoelectric disk on the diameter.

15. The vehicle alarm system according to claim 13, wherein the weight is a bolt.

16. The vehicle alarm system according to claim 13, wherein the circuit means comprises first and second capacitors connected in parallel, and first and second resistors connected in parallel with the first capacitor, and third and fourth resistors connected in parallel with the second capacitor.

17. The vehicle alarm system according to claim 16, further comprising a voltage source connected to the first resistor and wherein the third resistor is connected to ground.

18. The vehicle alarm system according to claim 13, wherein the microprocessor further determines an alarm condition if the microprocessor releases the stored value a second predetermined number of times within a second predetermined time period.

19. The vehicle alarm according to claim 13, wherein the storing means comprises a capacitor.

* * * * *